United States Patent [19]

Barbee et al.

[11] Patent Number: 4,855,397

[45] Date of Patent: Aug. 8, 1989

[54] POLYESTERAMIDE FROM AMINO ALCOHOL WITH IMPROVED GAS BARRIER PROPERTIES

[75] Inventors: Robert B. Barbee, Kingsport; Larry A. Minnick, Bluff City, both of Tenn.

[73] Assignee: Eastman Kodak Company, Rochester, N.Y.

[21] Appl. No.: 272,379

[22] Filed: Nov. 17, 1988

[51] Int. Cl.$^4$ ............................................. C08G 63/16
[52] U.S. Cl. .................................. 528/335; 528/183; 528/310; 528/337
[58] Field of Search ................ 528/310, 335, 337, 183

[56] References Cited

U.S. PATENT DOCUMENTS

| | | | |
|---|---|---|---|
| 2,386,454 | 10/1945 | Frosch | 528/335 |
| 2,463,977 | 3/1949 | Kropa | 528/335 |
| 4,209,607 | 6/1980 | Shalaby et al. | 528/335 |
| 4,728,548 | 3/1988 | Davis | 528/341 |

Primary Examiner—Harold D. Anderson
Assistant Examiner—T. Mason
Attorney, Agent, or Firm—Charles R. Martin; William P. Heath, Jr.

[57] ABSTRACT

Polyesteramide resins useful for forming containers having improved resistance to gas permeability comprising the reaction product of
(A) a dicarboxylic acid corresponding to the structure

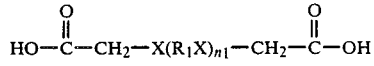

wherein X is —O—, —S— or

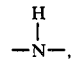

$n_1$ is 0 or 1 and $R_1$ is an aromatic structure containing 6 to 15 carbons, and
(B) an aminoalcohol corresponding to the formula

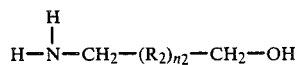

where $n_2$ is 0 or 1 and $R_2$ is an alphatic structure of 1 to 12 carbons.

5 Claims, No Drawings

POLYESTERAMIDE FROM AMINO ALCOHOL WITH IMPROVED GAS BARRIER PROPERTIES

The invention relates to polyesteramide resins useful for forming packages which have imported gas barrier properties.

Presently there is a strong interest in the packaging industry for protecting consumable products such as foodstuffs, medicines, and especially carbonated beverages by enveloping the substances in packages which are formed from various polymers. While molded containers formed from known polyesteramides have many desirable characteristics, there is a need in the art to provide improved polyesteramide containers which will have lower gas permeabilities. Such improved containers would be much more versatile in their utilization and allow the containers to be used to package substances for which containers of known polyesteramides may not be suitable.

In accordance with the present invention, it has been found that a particular polyesteramide exhibits enhanced gas barrier properties. The polyesteramide can be described as the reaction product of (A) a dicarboxylic acid corresponding to the structure

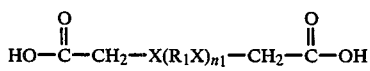

wherein X is —O—, —S— or

$n_1$ is 0 or 1 or $R_1$ is an aromatic structure containing 6 to 15 carbons, and (B) an aminoalcohol corresponding to the formula

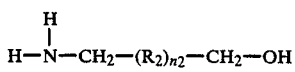

where $n_2$ is 0 or 1 and $R_2$ is an alphatic structure of 1 to 12 carbons.

More preferably $R_1$ is selected from the group consisting of

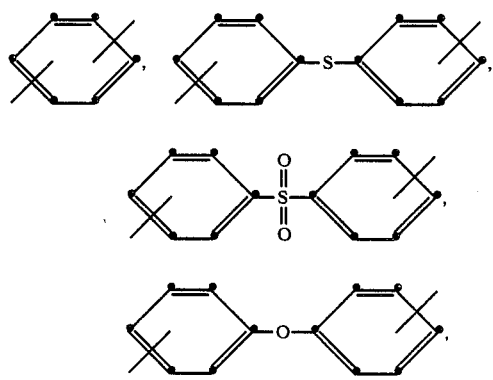

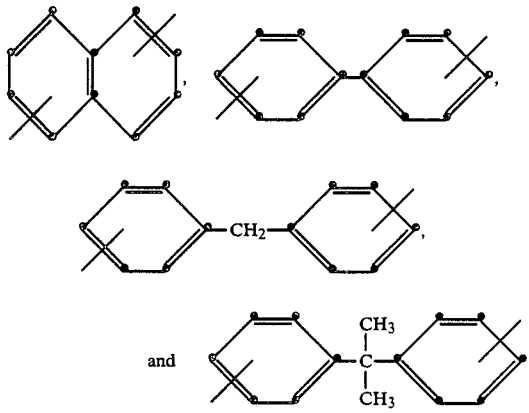

Most preferably $R_1$ is

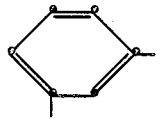

Most preferably X is —O— and $n_1$ is 1.

Examples of aminoalcohols include ethanolamine, 4-aminomethylcyclohexanemethanol, 5-aminopentanol, 5-amino-2,2-dimethylpentanol, 3-aminomethyl cyclohexanemthanol and 3-amino-2,2-dimethylpropanol. Preferably $R_2$ is 0 and the aminoalcohol is ethanol amine.

The polyesteramides of the present invention exhibit an inherent viscosity of at lest 0.5, preferably at least 1.0 measured at 25° C. in a 60/400 by weight mixture of phenol/tetrachloroethane at a concentration of 0.5 g/100 ml.

The polyesteramides of the present invention are prepared by methods well-known in the art. The reactants may all be reacted in a single operation or, alternatively, sequential operation may be employed. Temperatures which are suitable for forming the polyesteramides generally range between about 180° C. and about 295° C., with the prefered range being about 200° C. to 285° C. The reaction may be conducted under an inert atmosphere, such as nitrogen. Preferably, the latter stage of the reaction is conducted under a vacuum. Conventional catalysts are typically used.

Optionable additives, such as dyes, pogments, plasticizers, fillers, antioxidants and stabilizers may be employed in conventional amounts. Such additives may be added directly to the reaction or may be added to the final polymer.

The polyesteramides are formed into containers using conventional plastic processing techniques such as compression molding and blow molding. Preferably, the molded containers are biaxially oriented blow-molded containers. Strong, flexible and clear sheets, films and other like structures can be formed by well known extrusion techniques. These may be formed into wrappers, bags and the like.

The polyesteramides may also be used to form a laminating layer between two or more permeable layers of film. In like manner, a layer of the polyesteramide of the present invention may be coextruded as a pipe or similar structure between two or more compatible, permeable layers. The polyesteramides may also be used for dip coating containers from a polymer solution in order to improve the barrier properties of a package. In each of these embodiments, the present invention offers the additional advantage of not requiring the use of a tie layer.

Containers made from the polyesteramides are ideally suited for protecting consumable products, such as foodstuffs, soft drinks, and medicines. These containers desirable low oxygen and carbon dioxide permeability. Because of the decreased gas transmission rates of these polyesteramides, they perform well in packaging applications where improved gas barrier properties are required. Typically, the containers of the present invention exhibit an oxygen permeability of less than about 3.0, preferably, less than 2.5, and a carbon dioxide permeability of less than about 15, preferably, less than about 13, measured as cubic centimeters permeating a 1 mil thick sample, 100 inches square, for a 24-hour period under a partial pressure different of 1 atmosphere at 30° C.

EXAMPLES

This example describes a polyesteramide prepared from ethanolamine and 1,3-phenylenedioxydiacetic acid. 22.6 grams (0.1 mol) o f ethanolamine, 50 grams of water and 100 parts per million of titanium from acetyltriisopropyltitanate are combined. The reactants are heated with stirring under nitrogen for two hours and 40 minutes at 200° C. during which time water is allowed to distill. The nitrogen is removed and a reduced pressure of about 0.10 millimeter of mercury is applied with temperature at 200° C. for 2.5 hours. A viscous product results having an inherent viscosity of about 1.10. The product is ground to pass a three millimeter screen, dried and pressed into a film about 3–4 mils thick. The oxygen permeability of the film is measured to be 0.2 as determined in cubic centimeters permeating a 1 mil thick sample, 10 inches square, for a 24-hour period under an oxygen partial pressure difference of one atmosphere at 30° C. using a MOCON Oxtran 100 instrument.

We claim:

1. A polyesteramide having an inherent viscosity of at least 0.5 measured at 25° C. in a 60/40 by weight mixture of phenol/tetrachloroethane at a concentration of 0.5 g/100 mL, the polyesteramide comprising the reation product of
(A) a dicarboylic acid corresponding to the structure

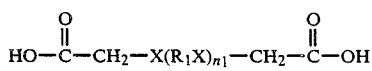

wherein X is —O—, —S—, or

$n_1$ is 0 or 1 and $R_1$ is an aromatic structure containing 6 to 15 carbons, and
(B) an aminoalcohol corresponding to the formula

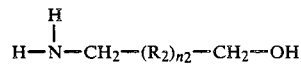

where $n_2$ is 0 or 1 and $R_2$ is an alphatic structure of 1 to 12 carbons.

2. The polyesteramide of claim 1 wherein $R_1$ is selected from the group consisting of

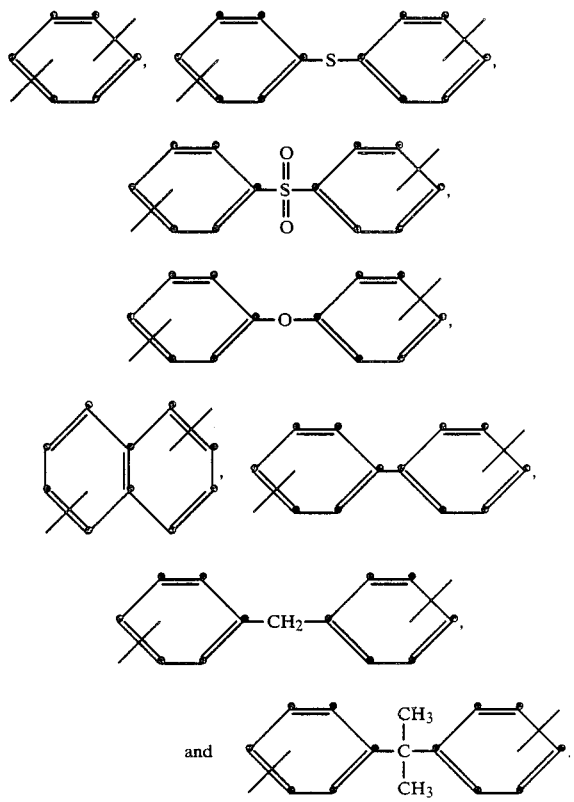

3. The polyesteramide of claim 1 wherein X is —O—, $R_1$ is,

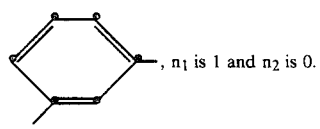

$n_1$ is 1 and $n_2$ is 0.

4. A container formed from the polyesteramide of claim 1.

5. A film formed from the polyesteramide of claim 1.